United States Patent [19]

Esparza

[11] Patent Number: 4,755,081
[45] Date of Patent: Jul. 5, 1988

[54] REDUCED J-TUBE PULL FORCE

[75] Inventor: Joe O. Esparza, Katy, Tex.

[73] Assignee: Shell Oil Company, Houston, Tex.

[21] Appl. No.: 65,174

[22] Filed: Jun. 16, 1987

Related U.S. Application Data

[63] Continuation of Ser. No. 868,985, May 30, 1986.

[51] Int. Cl.4 ............................................. F16L 1/04
[52] U.S. Cl. ...................................... 405/168; 72/41;
166/350/367; 405/169/195
[58] Field of Search .............. 166/77; 175/79; 285/95,
285/55

[56]  References Cited

U.S. PATENT DOCUMENTS

| | | | |
|---|---|---|---|
| 2,602,538 | 7/1952 | Bimba et al. | 72/41 |
| 2,670,225 | 2/1954 | McKinney | 166/77 X |
| 3,356,136 | 12/1967 | Haeber | 166/343 X |
| 3,551,005 | 12/1970 | Brun | 166/341 X |
| 3,595,312 | 7/1971 | Matthews | 405/168 X |
| 4,016,736 | 4/1977 | Carrison et al. | 72/41 |
| 4,098,091 | 7/1978 | Desai et al. | 405/195 x |
| 4,232,981 | 11/1980 | Lee | 405/154 |
| 4,380,948 | 4/1983 | Loving et al. | 102/343 X |
| 4,647,255 | 3/1987 | Pow | 405/168 |

Primary Examiner—Dennis L. Taylor

[57]  ABSTRACT

A method is provided for reducing the force required to pull a pipe through a J-tube riser by coating the pipe and/or the inside of the riser with a fluorocarbon polymer or copolymer.

3 Claims, 1 Drawing Sheet

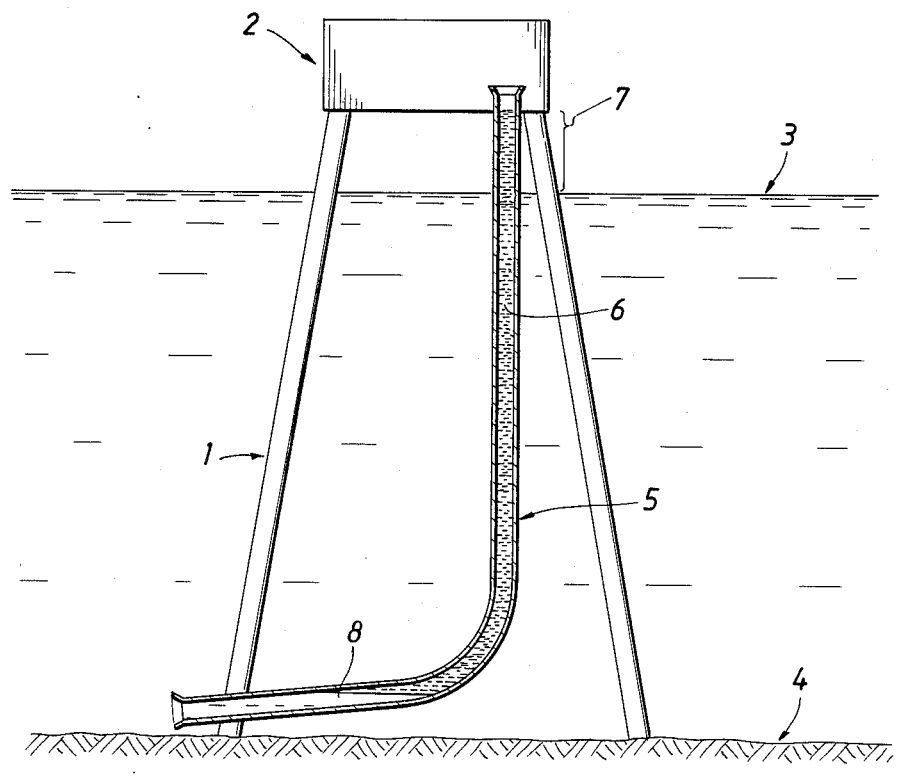

REDUCED J-TUBE PULL FORCE

This is a continuation of application Ser. No. 868,985, filed May 30, 1986.

BACKGROUND OF THE INVENTION

This invention pertains to the use of J-tubes on offshore platforms for installing pipelines extending upwardly from the seafloor.

In offshore petroleum operations, a platform frequently serves as an operational base and a production terminal for oil and gas wells. A problem common to all such offshore platforms is providing a connection from an above-water facility to a pipeline which lies on the seafloor. A typical method of providing the connection is the use of a J-tube guide member which is a continuous tubular structure having the shape of a J and through which a riser pipeline is pulled from the seafloor to the above-water facility. This J-tube runs down along the length of the platform, bends near the seafloor and thus runs generally parallel to the seafloor a short distance. The lower end of the J-tube frequently includes a flared portion referred to as a bell mouth. The upwardly pulled pipeline, i.e. the riser, provides a fluid flow path from the above-water facility to the pipeline on the seafloor.

At least two basic methods are known for installing the pipeline riser in the J-tube once the J-tube is positioned. In the so-called J-tube method, the pipeline riser is inserted in the seafloor end of the tube and pulled through it with a cable or other means. In the so-called reverse J-tube method, a section of the pipeline riser is inserted in the deck end of the J-tube and is pulled or pushed down through it as additional sections of conduit are joined to the pipeline riser at the deck. Both of these methods place tension on the pipeline riser as it is forced through the J-tube. This tension may cause displacement to the pipeline riser and J-tube which produce stresses that exceed the limits of the materials and cause damage to the pipeline riser or J-tube.

Unfortunately, the J-tube is generally useful for riser pipeline diameters only up to about 12 inches. For riser pipelines having a diameter greater than 12 inches, the high pulling force required to install the pipeline riser is a major deterrent to further use of the J-tube. The J-tube has the advantage of a controlled and simple installation process which does not require elaborate pipeline manipulating equipment, unlike other known installation processes.

Accorringly, it is a purpose of the present invention to provide a J-tube which has all the advantages of the conventional J-tube and which can be utilized with pipeline diameters greater than 12 inches without placing undue stresses upon the pipeline or the J-tube. Other purposes, advantages and features of the invention will be apparent to one skilled in the art upon review of the following disclosure.

This application is relevant to the following copending applications: application Ser. No. 866,658 filed May 27, 1986, application Ser. No. 876,153 filed June 19, 1986 and application Ser. No. 876,152 filed June 19, 1986.

Applicant is not aware of any prior art references which, in his judgment as one skilled in the pipeline art, would anticipate or render obvious the novel J-tube of the instant invention; however, for the purposes of developing the background of the invention and establishing the state of the requisite art, the following are set forth: U.S. Pat. Nos. 4,098,091 and 4,523,877.

SUMMARY OF THE INVENTION

The present invention provides a J-tube through which a pipeline can be moved by a reduced force.

Accordingly, the present invention provides a method for reducing the force required to move a pipe through a J-tube attached to an offshore platform and for reducing corrosion at the interface between air and salt water in the J-tube, comprising introducing a mixture of fluorocarbon polymer or copolymer and a carrier, preferably a hydrocarbon, into the J-tube, the mixture preferably having a lower specific gravity than water; and moving the pipe through the J-tube. In addition, the present invention provides a method for reducing the force required to move a pipe through a J-tube riser attached to an offshore platform comprising coating the pipe and/or inside the J-tube with a fluorocarbon polymer or copolymer.

BRIEF DESCRIPTION OF THE DRAWING

FIG. 1 provides a view of a J-tube utilized in accordance with the invention.

DESCRIPTION OF PREFERRED EMBODIMENTS

J-tubes are well known to the art as a means of installing pipeline risers onto fixed offshore platforms. The present invention involves a method for reducing the frictional component of the pull force during the installation of such a pipeline riser. This friction reduction may be accomplished by spraying, painting, taping, or extruding, etc., a coating comprising primarily a fluorocarbon polymer or copolymer, such as polytetrafluoroethylene or a fully fluorinated copolymer of hexafluoropropylene and tetrafluoroethylene, onto the riser pipe, which may be bare or coated, thus providing lubrication during the riser installation. Alternatively, the fluorocarbon polymer or copolymer (in spray, liquid, powder, tape, or sheet form) may be embedded in the outer layers of a corrosion coating such as neoprene or polyethylene on the riser pipe. Also alternatively, the fluorocarbon polymer or copolymer (spray, liquid, powder, tape, or sheet form) may be applied to the inner surface of the J-tube, preferably at the point of maximum anticipated contact pressure between pipe and conduit. Thus, the invention enjoys several advantages including (1) simple application of the fluorocarbon polymer or copolymer material to pipe and/or conduit (2) significant reduction of the maximum pull force, and (3) corrosion protection.

Another method of utilizing the fluorocarbon polymer or copolymer is to prepare a mixture of fluorocarbon polymer or copolymer preferably based in a hydrocarbon carrier although other suitable carriers may be used. This material is then poured into the J-tube from the top of the platform. Since the material preferably has a specific gravity less than that of water, a column of any desired height can be achieved. This serves a dual purpose: (1) it coats the pipe as it is pulled through and (2) it eliminates the corrosion that occurs at the interface between the salt water and air in the J-tube.

Having generally described the invention, the following is a more specific description of the invention given in connection with the accompanying drawing.

FIG. 1 disclosed an offshore bottom founded platform 1 having legs which maintain an above-water facility 2 above water level 3 and which rest firmly on the seafloor 4. A J-tube 5 extends upwardly from the seafloor 4 to the above-water facility 2. Within the riser 5 is a column of salt water which is substantially displaced when a pipeline (not shown) is inserted into the J-tube riser 5. In one embodiment of the invention a mixture of fluorocarbon polymer or copolymer and hydrocarbon carrier fills the J-tube riser to form a column 6 above salt water 8. The column 6 can extend as far down in J-tube 5 as desired since the fluorocarbon/hydrocarbon mixture has a specific gravity less than water and the head 7, i.e. the difference in elevation between water level 3 and the top of column 6, is adjustable as desired. That is, the selection of an appropriate carrier for the polymer or copolymer is a factor in determining the specific gravity of the mixture, and the length of the J-tube above sea level can be varied to accommodate the required height of column 6. When the pipe is passed through the J-tube riser, the polymer or copolymer in column 6 coats the pipe and reduces pulling and/or pushing friction. In addition, corrosion at the interface of the salt water 8 and the air formerly in the top of the J-tube riser is eliminated. In other embodiments of the invention the outside of the pipe riser and/or the inside of the J-tube 5 may be coated with the fluorocarbon polymer or copolymer.

The foregoing description of the invention is merely intended to be explanatory thereof. Various changes in the details of the described method and apparatus may be made within the scope of the appended claims without departing from the spirit of the invention. For example, the pipe may be pulled or pushed, or both pulled and pushed, through the J-tube from the top and/or bottom.

What is claimed is:

1. A method for reducing the force required to move a pipe through a J-tube attached to an offshore platform and for reducing corrosion at the interface between air and salt water in the J-tube comprising:

introducing a mixture of fluorocarbon polymer and a hydrocarbon carrier into the J-tube, the mixture having a lower specific gravity than water; and moving the pipe through the J-tube.

2. The method of claim 1 wherein the fluorocarbon polymer is polytetrafluoroethylene and the carrier is a hydrocarbon.

3. A method for reducing the force required to move a pipe through a J-tube attached to an offshore platform and for reducing corrosion at the interface between air and salt water in the J-tube comprising:

introducing a mixture of fluorocarbon copolymer and a hydrocarbon carrier into the J-tube, the mixture having a lower specific gravity than water; and moving the pipe through the J-tube.

* * * * *